United States Patent [19]
Fujio et al.

[11] 3,981,943
[45] Sept. 21, 1976

[54] RUBBER COMPOSITIONS OF POLYISOPRENE α-METHYLSTYRENE, DIVINYLBENZENE AND DIALKYL PEROXIDE

[75] Inventors: Ryota Fujio, Akigawa; Nobuyuki Kataoka, Tokyo; Yoshihide Fukabori; Shiro Anzai, both of Higashi-Murayama, all of Japan

[73] Assignee: Bridgestone Fire Company Limited, Tokyo, Japan

[22] Filed: Apr. 15, 1974

[21] Appl. No.: 461,046

[30] Foreign Application Priority Data
Apr. 13, 1973  Japan................................ 48-41316
June 30, 1973  Japan................................ 48-73852

[52] U.S. Cl............................................. 260/880 R
[51] Int. Cl.² ........................................... C08L 9/00
[58] Field of Search ............................. 260/880 R

[56] References Cited
UNITED STATES PATENTS
| | | | |
|---|---|---|---|
| 3,009,899 | 11/1961 | Stahly | 260/45.9 |
| 3,350,449 | 10/1967 | Wheeler | 260/576 |
| 3,424,821 | 1/1969 | Hunter | 260/880 |
| 3,427,264 | 2/1969 | Forster | 260/4 |
| 3,636,141 | 1/1972 | O'Neill | 260/880 R |
| 3,652,732 | 3/1972 | Makowski | 260/880 B |
| 3,751,524 | 8/1973 | Haigh | 260/878 R |

FOREIGN PATENTS OR APPLICATIONS
| | | | |
|---|---|---|---|
| 829,457 | 1957 | Japan | 260/880 R |

*Primary Examiner*—Christopher A. Henderson, Jr.
*Attorney, Agent, or Firm*—Sughrue, Rothwell, Mion, Zinn and Macpeak

[57] ABSTRACT

One shot mouldable and curable homogeneous rubber composition consisting mainly of polyisoprene rubber and a monomer mixture composed of divinylbenzene and α-methylstyrene in specifically limited weight ratios of the rubber/the monomer mixture and of divinylbenzene/α-methylstyrene and containing small amounts of organic peroxide and at least one of amine compound and phenol compound. The cured product of the rubber composition has high Young's modulus, tear energy and tensile strength retention. More improved cured rubbers having these physical properties well balanced in a high level can be easily obtained by additionally adding a small amount of sulfur or p-quinonedioxime to the above rubber composition.

8 Claims, 1 Drawing Figure

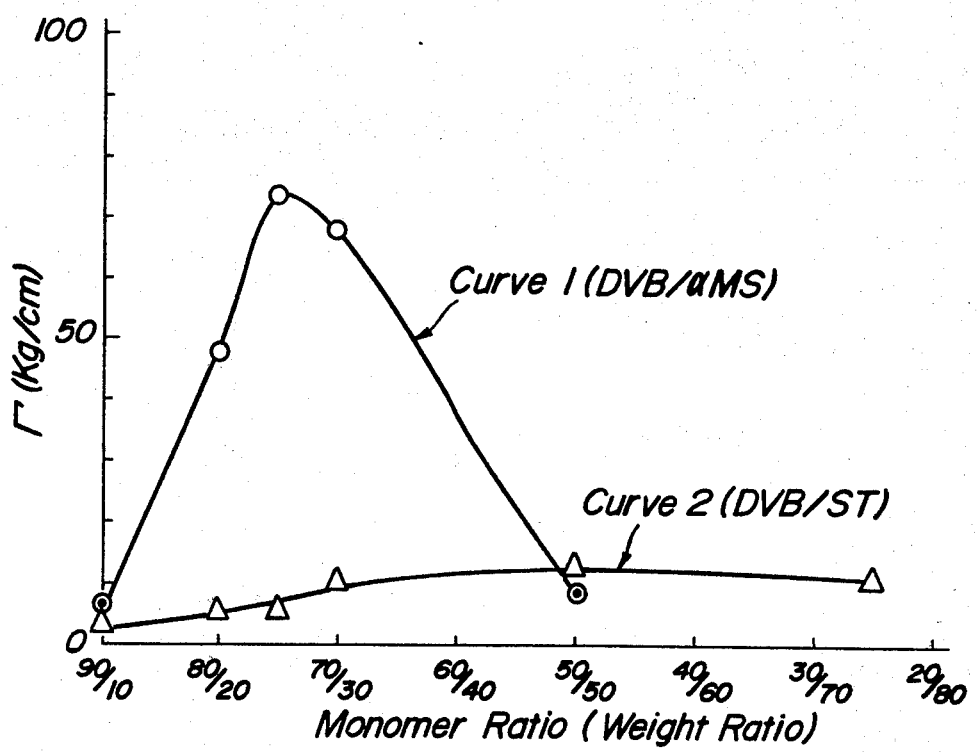

RUBBER COMPOSITIONS OF POLYISOPRENE α-METHYLSTYRENE, DIVINYLBENZENE AND DIALKYL PEROXIDE

BACKGROUND OF THE INVENTION

1. Field of the Invention

The present invention relates to a one shot mouldable and curable homogeneous rubber composition having a high Young's modulus, and more particularly to a rubber composition consisting mainly of polyisoprene rubber and a monomer mixture composed of divinylbenzene and α-methylstyrene, which has a high Young's modulus, a high tear energy Γ and a high tensile strength retension at high temperature in the cured state.

2. Description of the Prior Art

Conventional rubber compositions composed of rubber and various compounding ingredients have a low Young's modulus, and when it is intended to use the rubber composition in a portion, wherein a high mechanical strength is required, it has been necessary to use the rubber composition in the form of a laminate combined with fibers and other reinforcing materials. However, it is troublesome to effect laminating and moulding, and moreover, the resulting moulded articles are often poor in the homogeneity.

The present invention provides a one shot mouldable homogeneous rubber composition having all of the above described excellent physical properties. Moulded articles prepared from the rubber composition of the present invention have a sufficiently high mechanical strength without the use of reinforcing materials, such as fibers and the like, and are low in the permanent strain and excellent in the low-temperature characteristics and in the airtightness, and further are inexpensive.

There have been known several one shot mouldable rubber compositions composed of specifically limited rubber and specifically limited monomer. For example, U.S. Pat. No. 3,313,545 discloses a method wherein a rubber composition composed of cis-1,4-polybutadiene, divinylbenzene, silica and dicumyl peroxide and the like is heated and cured. There is a description in the U.S. Patent that the cured rubber obtained in this method is used as a material for solid golf ball. However, the cured rubber has an extremely high Young's modulus and an extremely low elongation and tear energy Γ. That is, in the cured rubber, characteristic properties inherent to rubber are lost, and the rubber cannot develop fully performances as an elastomer. A method, wherein a rubber composition composed of polyisoprene rubber, styrene, divinylbenzene and an organic peroxide is heated and cured, is disclosed, for example, in Japanese Patent Application Publication No. 8,294/57, but the cured rubber has a very low tear energy Γ over a wide range of rubber/monomer ratio and is poor in various performances at high temperature. Further, a method, wherein a rubber composition composed of polyisoprene rubber, trimethylolpropane trimethacrylate, sulfur and an organic peroxide is heated and cured, has been known (Preprint of "Problems in Recent Rubber Technics", Pages 5-19, (1972), Japan Chemical Engineering Union). However, the resulting cured rubber is very low in the Young's modulus and tear energy Γ.

SUMMARY OF THE INVENTION

An object of the present invention is to provide a homogeneous rubber composition having a high Young's modulus and excellent physical properties in the cured state.

Another object of the present invention is to provide a rubber composition having, after curing, performances without the use of reinforcing materials, such as fibers and the like, which performances are substantially equal to those of conventional cured rubber composition reinforced with the reinforcing materials.

Further object of the present invention is to provide a one shot mouldable rubber composition having a fluidity before curing and being able to be made into a final product by one stage curing after moulding.

The present invention will be explained in more detail.

The present invention relates to a one shot mouldable and curable homogeneous rubber composition having a high Young's modulus, which comprises 100 parts by weight of a mixture of the following ingredients (a) and (b), said ingredient (a) being polyisoprene rubber having at least 90% of cis-1,4 bonds, and said ingredient (b) being a monomer mixture composed of divinylbenzene and α-methylstyrene, c. 0.5–2.5 parts by weight of an organic peroxide, and
d. 0.1–2.5 parts by weight of at least one compound selected from the group consisting of amine compounds and phenol compounds, the weight ratio of divinylbenzene/α-methylstyrene in said ingredient (b) being 80/20–65/35 and the weight ratio of said ingredient (a)/said ingredient (b) being 65/35–50/50, and the rubber composition cured at 120°–180°C having a Young's modulus of 100–500 Kg/cm², a tear energy Γ of at least 20 Kg/cm and a tensile strength retention at 100°C of at least 60%.

Furthermore, when 0.01–0.20 part by weight, based on 100 parts by weight of the total amount of the ingredients (a) and (b), of at least one of sulfur and p-quinonedioxime is compounded to the above described rubber composition, more improved rubber composition having well-balanced Young's modulus, tear energy Γ and tensile strength retention at 100°C in a high level in the cured state can be easily obtained.

A rubber composition having the above described remarkably excellent physical properties can be obtained only when specifically limited kinds of ingredients are used in a specifically limited composition ratio under a specifically limited condition according to the present invention, and the technical idea for producing such rubber composition cannot be conceived from conventional rubber compositions.

BRIEF DESCRIPTION OF THE DRAWING

The single FIGURE is a graph showing relations of the value of tear energy Γ to the monomer ratio of divinylbenzene/α-methylstyrene or divinylbenzene/styrene in the following Examples 1 to 3 and Comparative Examples 1 to 6.

DETAILED DESCRIPTION OF THE PREFERRED EMBODIMENTS

The ingredient (a) to be used in the present invention is polyisoprene rubber having at least 90% of cis-1,4 bonds. The polyisoprene rubber includes synthetic cispolyisoprene rubber, natural rubber, and copolymers consisting substantially of cis-1,4-polyisoprene.

The ingredient (b) is a monomer mixture composed of divinylbenzene and α-methylstyrene. The ingredient (b) is very important in order to increase the Young's modulus, tear energy $\Gamma$ and high-temperature characteristics of the rubber composition in the cured state.

As the organic peroxide to be used as the ingredient (c), mention may be made of di-alkyl peroxides, such as dicumyl peroxide, di-t-butyl peroxide, 1,1-bis-t-butyl-3,3,5-trimethylperoxycyclohexane, t-butyl cumyl peroxide, 2,5-dimethyl-2,5-di-t-butylperoxyhexane and the like. Among them, dicumyl peroxide, t-butyl cumyl peroxide and 1,1-bis-t-butyl-3,3,5-trimethylperoxycyclohexane are particularly preferable.

The ingredient (d) includes amine compound and phenol compound. As the amine compound, various amines can be used, but aromatic secondary amines are preferable. Among them, N-phenyl-N'-isopropyl-p-phenylenediamine, phenyl-β-naphthylamine, diphenylamine and the like are particularly preferable.

As the phenol compound, various alkyl-substituted phenol derivatives can be used. Among them, 2,6-di-t-butyl-4-methylphenol, 1,1'-bis(4-hydroxyphenyl)cyclohexane, 2,2'-methylene-bis(4-methyl-6-t-butylphenol), 4,4'-thio-bis(6-t-butyl-3-methylphenol), styrenated phenol and the like are particularly preferable.

The ingredient (e) includes sulfur and p-quinonedioxime. The sulfur can be used in any form which is generally used in the cross-linking of rubber. Further, microcapsulated sulfur may also be used.

In the present invention, when the vulcanization accelerator is compounded to the rubber composition, physical properties of the composition in the cured state are more improved. As the vulcanization accelerator, mention may be made of vulcanization accelerators generally used for rubber, such as diphenylguanidine, mercaptobenzothiazole, tetramethylthiuram disulfide and the like. Among them, diphenylguanidine is particularly preferable.

Further, in the present invention, commonly used compounding agents, such as ozone-crack preventing agent, light stabilizer and the like, can be added to the rubber composition depending upon the purpose.

In the present invention, the above described ingredients (a)–(e) are compounded in amounts within the following range. The amount of ingredient (a) is 50–65 parts by weight, that of ingredient (b) is 35–50 parts by weight, the weight ratio of ingredient (a)/ingredient (b) being 65/35–50/50, that of ingredient (c) is 0.5–2.5 parts by weight, that of ingredient (d) is 0.1–2.5 parts by weight and that of ingredient (e) is 0.01–0.20 part by weight. In this case, the amount of ingredient (c), (d) or (e) means part by weight based on 100 parts by weight of the total amount of ingredients (a) and (b). That is, the ingredients (a) and (b) should be compounded within the above described range so that their total amount is 100 parts by weight.

In the present invention, the weight ratio of ingredient (a)/ingredient (b) is very important and should be within the range of 65/35–50/50, preferably 60/40–55/45. When the weight ratio of ingredient (a)/ingredient (b) is larger than 65/35, the Young's modulus and tear energy $\Gamma$ of the cured rubber are decreased, while when the weight ratio is smaller than 50/50, the cured rubber has an extremely high Young's modulus and low tear energy $\Gamma$ and elongation, and therefore cured rubbers having the above described physical properties cannot be obtained.

Further, the weight ratio of divinylbenzene to α-methylstyrene in the ingredient (b) is very important in the present invention, and the weight ratio should be within the range of 80/20–65/35, preferably 80/20–70/30. When the weight ratio of divinylbenzene/α-methylstyrene is larger than 80/20, the Young's modulus of the cured rubber is increased, but the tear energy $\Gamma$ thereof is considerably decreased. While, when the weight ratio is smaller than 65/35, both of the Young's modulus and the tear energy $\Gamma$ thereof are decreased. This phenomenon is clear from the accompanied FIGURE. Moreover, when styrene is used instead of α-methylstyrene, the tear energy $\Gamma$ of the cured rubber is low in any of the monomer ratios of divinylbenzene/styrene. This fact is also shown in the FIGURE.

In the present invention, the amount of the ingredient (c) is also important. The organic peroxide of ingredient (c) has two rolls. The one is to act as an initiator which causes polymerization of monomers of the ingredient (b) to form a polymer. The other is to act as a crosslinking agent which causes crosslinking reaction between the above formed polymer and the previously compounded ingredient (a) to form an elastomer having a three-dimensional structure. In order to attain this objects, it is necessary to use the ingredient (c) in an amount of 0.5–2.5 parts by weight, preferably 0.8–2.0 parts by weight.

The phenol compound or amine compound of the ingredient (d) of the present invention is compounded in order to secure the heat resistance and the stability of the cured rubber and further to maintain the tear energy $\Gamma$ thereof in the desired value in combination with sulfur or p-quinonedioxime of the ingredient (e) and the vulcanization accelerator. The addition amount of the ingredient (d) is 0.1–2.5 parts by weight. A preferred addition amount is 0.3–0.7 part by weight in the case of the amine compound, and is 0.5–2.0 parts by weight in the case of the phenol compound.

When the amine compound is used together with the above described organic peroxide, if the addition amount of the amine compound exceeds, for example, 2.0 parts by weight, the curing reaction is retarded, and the use of the amine compound under such condition is not effective in the present invention.

The ingredient (e) of the present invention is sulfur or p-quinonedioxime. The ingredient (e) serves to give a high Young's modulus to the cured rubber of the present invention while maintaining the tear energy $\Gamma$. In order to develop the effect of the ingredient (e), it is necessary to add the ingredient (e) in an amount of 0.01–0.20 part by weight, preferably 0.05–0.15 part by weight. When the addition amount of the ingredient (e) is smaller or higher than the above described range, the Young's modulus and tear energy $\Gamma$ of the cured rubber are lower than the desired values. This fact will be clarified in the following Comparative Examples.

Furthermore, the curing reaction of the rubber composition of the present invention is promoted by adding a small amount of vulcanization accelerators, such as diphenylguanidine and the like, commonly used for rubbers, but when the curing condition is properly selected, cured rubbers having physical properties aimed in the present invention can be obtained without the use of the vulcanization accelerator. The vulcanization accelerator is used in an amount of not more than 0.1 part by weight.

The above described rubber composition of the present invention is easily cured by heating at a temperature of about 120°–180°C, preferably about 140°–170°C, for 1–60 minutes, preferably 3–40 minutes, and the resulting cured rubber has a high Young's modulus, and is excellent in the tear resistance, heat resistance and rubber elasticity, and further can maintain these excellent physical properties within a broad temperature range. Therefore, the rubber composition of the present invention is remarkably useful as a material for producing one shot moulded articles, which are used under severe temperature and mechanical conditions, such as vibration insulating rubber, bumper, tire, flexible joint, guide roller, dock fender, belt, hose, packing material, joint sealing element, sealing material and other water-resistant material, heat-resistant material, low-temperature resistant material and the like. Of course, the rubber composition can be widely used similarly to conventional rubber materials.

The following examples are given for the purpose of illustration of this invention and are not intended as limitations thereof. In the examples, the part means part by weight.

EXAMPLES 1–3

The following ingredients, (a) cis-1,4-polyisoprene (Trademark Natsyn 2200, made by Goodyear Tire & Rubber Co.), (b) divinylbenzene (55% divinylbenzene, made by Sankyo Chemical Industry Co.) and α-methylstyrene, (c) dicumyl peroxide and (d) N-phenyl-N'-isopropyl-p-phenylenediamine were kneaded according to the following Compounding Recipe 1 at room temperature by means of a mixing roll. The resulting homogeneous rubber compositions were heated and cured at 150°C for 30 minutes to produce cured rubbers.

Compounding Recipe 1

| | Ingredient | | Example 1 | 2 | 3 |
|---|---|---|---|---|---|
| (a) | Isoprene rubber (Natsyn 2200) | (part) | 57 | 57 | 57 |
| (b) | Divinylbenzene (DVB) | (part) | 34.4 | 32.25 | 30.1 |
| (b) | α-Methylstyrene (αMS) | (part) | 8.6 | 10.75 | 12.9 |
| | Weight ratio of DVB/αMS | | 80/20 | 75/25 | 70/30 |
| (c) | Dicumyl peroxide | (part) | 1.5 | 1.5 | 1.5 |
| (d) | N-phenyl-N'-isopropyl-p-phenylenediamine | (part) | 0.5 | 0.5 | 0.5 |

Physical properties of the above obtained cured rubbers are shown in the following Table 1.

Table 1

| Physical property | | | Example 1 | 2 | 3 |
|---|---|---|---|---|---|
| Tensile strength | (at 20°C) | (Kg/cm²) | 190 | 229 | 211 |

Table 1-continued

| Physical property | | | Example 1 | 2 | 3 |
|---|---|---|---|---|---|
| Elongation | (at 20°C) | (%) | 250 | 300 | 310 |
| $E_{10}$[1] | (at 20°C) | (Kg/cm²) | 182 | 166 | 112 |
| Γ[2] | (at 20°C) | (Kg/cm) | 47 | 74 | 67 |
| Tensile strength retention[3] | | (%) | 70 | 66 | 72 |

Note:
[1] Young's modulus measured at 10% elongation.
[2] Tear energy measured in the following manner. A cut having a length of 2 mm is made to a strip-shaped rubber sample having a length of 60 mm, a width of 10 mm and a thickness of 2 mm from the side at the center portion of the length of the sample in a direction perpendicular to the longitudinal direction of the sample, and the energy required for tearing the sample is measured. The higher the value, the more excellent tear characteristics the sample has.
[3] Tensile strength retention $= \dfrac{\text{Tensile strength at 100°C}}{\text{Tensile strength at 20°C}} \times 100(\%)$ It can be seen from Table 1 that the cured rubbers have sufficiently high Young's modulus, tear energy Γ and tensile strength retention at 100°C, and the rubber composition can be used in the one shot moulding.

COMPARATIVE EXAMPLES 1 and 2

Rubber compositions were prepared according to the following Compounding Recipe 2 in the same manner as described in Examples 1–3, and the resulting rubber compositions were heated and cured at 150°C for 30 minutes.

Compounding Recipe 2

| | Ingredient | | Comparative Example 1 | 2 |
|---|---|---|---|---|
| (a) | Isoprene rubber (Natsyn 2200) | (part) | 57 | 57 |
| (b) | Divinylbenzene (DVB) | (part) | 38.7 | 21.5 |
| (b) | α-Methylstyrene (αMS) | (part) | 4.3 | 21.5 |
| | Weight ratio of DVB/αMS | | 90/10 | 50/50 |
| (c) | Dicumyl peroxide | (part) | 1.5 | 1.5 |
| (d) | N-phenyl-N'-isopropyl-p-phenylenediamine | (part) | 0.5 | 0.5 |

Physical properties of the resulting cured rubbers are shown in the following Table 2.

Table 2

| Physical property | | | Comparative Example 1 | 2 |
|---|---|---|---|---|
| Tensile strength | (at 20°C) | (Kg/cm²) | 189 | 187 |
| Elongation | (at 20°C) | (%) | 190 | 390 |
| $E_{10}$ | (at 20°C) | (Kg/cm²) | 275 | 44 |
| Γ | (at 20°C) | (Kg/cm) | 7 | 8 |

COMPARATIVE EXAMPLES 3–6

Styrene was used instead of α-methylstyrene used in Examples 1–3, and rubber compositions were prepared according to the following Compounding Recipe 3 in the same manner as described in Examples 1–3.

Compounding Recipe 3

| | Ingredient | | Comparative Example 3 | 4 | 5 | 6 |
|---|---|---|---|---|---|---|
| (a) | Isoprene rubber (Natsyn 2200) | (part) | 57 | 57 | 57 | 57 |
| (b) | Divinylbenzene (DVB) | (part) | 38.7 | 34.4 | 32.25 | 30.1 |
| (b) | Styrene (ST) | (part) | 4.3 | 8.6 | 10.75 | 12.9 |
| | Weight ratio of DVB/ST | | 90/10 | 80/20 | 75/25 | 70/30 |
| (c) | Dicumyl peroxide | (part) | 1.5 | 1.5 | 1.5 | 1.5 |
| (d) | N-phenyl-N'-isopropyl- | | | | | |

Compounding Recipe 3-continued

| Ingredient | | Comparative Example | | | |
|---|---|---|---|---|---|
| | | 3 | 4 | 5 | 6 |
| p-phenylenediamine | (part) | 0.5 | 0.5 | 0.5 | 0.5 |

The resulting rubber compositions were heated and cured at 150°C for 30 minutes to obtain cured rubbers having the physical properties as shown in the following Table 3.

Table 3

| Physical property | | | Comparative Example | | | |
|---|---|---|---|---|---|---|
| | | | 3 | 4 | 5 | 6 |
| Tensile strength | (at 20°C) | (Kg/cm$^2$) | 175 | 182 | 184 | 172 |
| Elongation | (at 20°C) | (%) | 155 | 170 | 180 | 170 |
| $E_{10}$ | (at 20°C) | (Kg/cm$^2$) | 367 | 300 | 282 | 224 |
| $\Gamma$ | (at 20°C) | (Kg/cm) | 4 | 6 | 6 | 9 |
| Tensile strength retention | | (%) | not measured | 51 | 53 | 60 |

It can be seen from Table 3 that when styrene is used instead of α-methylstyrene to be used in the ingredient (b) of the rubber composition of the present invention, the tear energy Γ of the cured rubber is considerably decreased, and further the tensile strength retention at 100°C thereof is decreased.

It can be seen from the comparison of Examples 1–3 with Comparative Examples 1–6 that the tear energy Γ of the cured rubber composition of the present invention is considerably higher than that of the cured rubber composition of Comparative Examples 3–6, which contains styrene instead of α-methylstyrene used in the present invention, and that when the ratio of DVB/αMS is outside the scope of the present invention (Comparative Examples 1 and 2), the tear energy Γ is considerably decreased.

The single FIGURE shows relations of the value of tear energy Γ to the DVB/αMS ratio and to the DVB/ST ratio in Examples 1–3 and Comparative Examples 1–6.

In the FIGURE, the curve 1 shows the relation of the Γ value to the DVB/αMS ratio, and the mark "o" corresponds to Examples 1–3, and the mark "⊙" corresponds to Comparative Examples 1 and 2. The curve 2 shows the relation of the Γ value to the DVB/ST ratio. Experiments at DVB/ST ratios of 50/50 and 25/75 are not shown in this specification.

EXAMPLE 4

The following ingredients were compounded in the same manner as described in Examples 1–3.

| (a) | Isoprene rubber (Natsyn 2200) | 60 (parts) |
|---|---|---|
| (b) | Divinylbenzene (DVB) | 30 (parts) |
| (b) | α-Methylstyrene | 10 (parts) |
| | Weight ratio of DVB/αMS | 75/25 |
| (c) | Dicumyl peroxide | 1.2 (parts) |
| (d) | 2,2'-Methylene-bis(4-methyl-6-t-butylphenol) | 0.5 (part) |

The resulting homogeneous composition was heated and cured at 160°C for 20 minutes. The resulting cured rubber had the following physical properties.

| Tensile strength | (at 20°C) | (Kg/cm$^2$) | 250 |
|---|---|---|---|
| Elongation | (at 20°C) (%) | | 360 |
| $E_{10}$ | (at 20°C) | (Kg/cm$^2$) | 119 |
| $\Gamma$ | (at 20°C) | (Kg/cm) | 36 |
| Tensile strength retention | | (%) | 60 |

When a curing is effected at 160°C for 20 minutes, a cured rubber having excellent physical properties can also be obtained.

EXAMPLES 5–7 AND COMPARATIVE EXAMPLES 7 and 8

The following ingredients, (a) cis-1,4-polyisoprene (Natsyn 2200), (b) divinylbenzene and α-methylstyrene, (c) dicumyl peroxide, (d) N-phenyl-N'-isopropyl-p-phenylenediamine, (e) sulfur and a vulcanization accelerator of diphenylguanidine were kneaded according to the following Compounding Recipe 4 at room temperature by means of a mixing roll, and the resulting homogeneous rubber composition was heated and cured at 150°C for 30 minutes to obtain a cured rubber.

Compounding Recipe 4

| Ingredient | | | Example | | | Comparative Example | |
|---|---|---|---|---|---|---|---|
| | | | 5 | 6 | 7 | 7 | 8 |
| (a) | Isoprene rubber (Natsyn 2200) | (part) | 56 | 57 | 58 | 48 | 67 |
| (b) | Divinylbenzene (DVB) | (part) | 33.0 | 32.25 | 31.5 | 39 | 24.75 |
| (b) | α-Methylstyrene (αMS) | (part) | 11.0 | 10.75 | 10.5 | 13 | 8.25 |
| | Weight ratio of DVB/αMS | | 75/25 | 75/25 | 75/25 | 75/25 | 75/25 |
| (c) | Dicumyl peroxide | (part) | 1.5 | 1.5 | 1.5 | 1.5 | 1.5 |
| (d) | N-Phenyl-N'-isopropyl-p-phenylenediamine | (part) | 0.5 | 0.5 | 0.5 | 0.5 | 0.5 |
| (e) | Sulfur | (part) | 0.1 | 0.1 | 0.1 | 0.1 | 0.1 |
| | Diphenylguanidine (vulcanization | (part) | 0.05 | 0.05 | 0.05 | 0.05 | 0.05 |

Compounding Recipe 4-continued

| Ingredient | Example | | | Comparative Example | |
|---|---|---|---|---|---|
| | 5 | 6 | 7 | 7 | 8 |
| accelerator) | | | | | |

Physical properties of the above obtained cured rubbers are shown in the following Table 4.

Table 4

| Physical property | | | Example | | | Comparative Example | |
|---|---|---|---|---|---|---|---|
| | | | 5 | 6 | 7 | 7 | 8 |
| Tensile strength | (at 20°C) | (Kg/cm$^2$) | 196 | 204 | 190 | 166 | 165 |
| Elongation | (at 20°C) | (%) | 230 | 250 | 260 | 50 | 382 |
| $E_{10}$ | (at 20°C) | (Kg/cm$^2$) | 270 | 241 | 206 | 538 | 41 |
| $\Gamma$ | (at 20°C) | (Kg/cm) | 48 | 37 | 57 | 2 | 4 |
| Tensile strength retention | | (%) | 65 | 63 | 63 | 65 | 52 |

It can be seen from Table 4 that the cured rubbers have sufficiently high Young's modulus and tear energy $\Gamma$ and tensile strength retention at 100°C, and the rubber composition can be used in the one shot moulding.

When the ratio of rubber ingredient (a)/monomer ingredient (b) is too low as shown in Comparative Example 7, a cured rubber having an extremely high Young's modulus, a low tear energy $\Gamma$ and a poor elongation is formed. While, when the ratio of rubber ingredient (a)/monomer ingredient (b) is too high as shown in Comparative Example 8, a cured rubber having low Young's modulus and tear energy $\Gamma$ is formed.

COMPARATIVE EXAMPLES 9–13

Rubber compositions having a composition outside the scope of the present invention were prepared according to the following Compounding Recipe 5 in the same manner as described in Examples 5–7, and the resulting rubber compositions were heated and cured at a given temperature for a given time as shown in the Recipe 5.

Compounding Recipe 5

| Ingredient | | | Comparative Example | | | | |
|---|---|---|---|---|---|---|---|
| | | | 9 | 10 | 11 | 12 | 13 |
| (a) | Butadiene rubber (BR01*) | (part) | 62 | — | — | — | — |
| (a) | Isoprene rubber (Natsyn 2200) | (part) | — | 57 | 100 | 57 | 58 |
| (b) | Divinylbenzene(DVB) | (part) | 38 | 32.25 | — | 43 | 42 |
| (b) | Styrene (ST) | (part) | — | 10.75 | — | — | — |
| | Weight ratio of DVB/ST | | — | 75/25 | — | — | — |
| (b) | Trimethylolpropane trimethacrylate | (part) | — | — | 2 | — | — |
| (c) | Dicumyl peroxide | (part) | 1.9 | 1.5 | 2 | 1.5 | — |
| (d) | N-Phenyl-N'-isopropyl-p-phenylenediamine | (part) | — | 0.5 | — | 0.5 | 0.5 |
| (e) | Sulfur | (part) | — | — | 0.2 | — | 0.1 |
| | Diphenylguanidine (vulcanization accelerator) | (part) | — | — | — | — | 0.05 |
| | Silica powder | (part) | 38 | — | — | — | — |
| Curing temperature (°C) | | | 150 | 150 | 155 | 150 | 150 |
| Curing time (min.) | | | 10 | 30 | 30 | 30 | 30 |
| Literature | | | (I) | (II) | (III) | (IV) | (V) |

Note:
*Polybutadiene, made by Japan Synthetic Rubber Co.
(I)U.S. Pat. No. 3,313,545
(II)Japanese Patent Application Publication No. 8,294/57
(III)Preprint of "Problems in Recent Rubber Technics", Pages 5–19 (1972)
(IV)Japanese Patent Application No. 37,394/73
(V)Japanese Patent Application No. 63,747/73

Physical properties of the above obtained cured rubbers are shown in the following Table 5.

Table 5

| Physical property | | | Comparative Example | | | | |
|---|---|---|---|---|---|---|---|
| | | | 9 | 10 | 11 | 12 | 13 |
| Tensile strength | (at 20°C) | (Kg/cm$^2$) | 168 | 184 | 44 | 181 | 182 |
| Elongation | (at 20°C) | (%) | 15 | 180 | 535 | 227 | 250 |
| $E_{10}$ | (at 20°C) | (Kg/cm$^2$) | 1,121 | 282 | 17 | 228 | 148 |
| $\Gamma$ | (at 20°C) | (Kg/cm) | 1.3 | 6 | 3 | 11 | 14.9 |
| Tensile strength retention | | (%) | 67 | 53 | 42 | 67 | 68 |

It can be seen from the comparison of Examples 5–7 with Comparative Examples 9–13 that the rubber composition of the present invention is superior to any of rubber compositions outside the scope of the present invention in the point that the physical properties of the rubber composition of the present invention are well balanced in a high level.

EXAMPLES 8 and 9

Rubber compositions having a composition within the scope of the present invention were prepared according to the following Compounding Recipe 6 in the same manner as described in Examples 5–7, and the resulting rubber compositions were heated and cured at 150°C for 30 minutes.

Table 6

| Physical property | | | Example 8 | Example 9 |
|---|---|---|---|---|
| Tensile strength | (at 20°C) | (Kg/cm$^2$) | 182 | 186 |
| Elongation | (at 20°C) | (%) | 240 | 210 |
| $E_{10}$ | (at 20°C) | (Kg/cm$^2$) | 173 | 152 |
| $\Gamma$ | (at 20°C) | (Kg/cm) | 24 | 21 |
| Tensile strength retention | | (%) | 75 | 61 |

EXAMPLES 10–14

Rubber compositions having a composition within the scope of the present invention were prepared according to the following Compounding Recipe 7 in the same manner as described in Examples 5–7, and the resulting rubber compositions were heated and cured at 150°C for 30 minutes.

Compounding Recipe 7

| Ingredient | | | Example 10 | Example 11 | Example 12 | Example 13 | Example 14 |
|---|---|---|---|---|---|---|---|
| (a) | Isoprene rubber (Natsyn 2200) | (part) | 58 | 58 | 58 | 58 | 57 |
| (b) | Divinylbenzene (DVB) | (part) | 31.5 | 31.5 | 31.5 | 31.5 | 32.25 |
| (b) | α-Methylstyrene (αMS) | (part) | 10.5 | 10.5 | 10.5 | 10.5 | 10.75 |
| | Weight ratio of DVB/αMS | | 75/25 | 75/25 | 75/25 | 75/25 | 75/25 |
| (c) | Dicumyl peroxide | (part) | — | 1.5 | 1.5 | 1.5 | 1.5 |
| (c) | 2,5-Dimethyl-2,5-di-t-butylperoxyhexane | (part) | 1.5 | — | — | — | — |
| (d) | N-Phenyl-N'-isopropyl-p-phenylenediamine | (part) | — | — | — | 0.5 | — |
| (d) | Diphenylamine | (part) | — | — | — | — | 0.3 |
| (d) | 2,2'-Methylene-bis(4-methyl-6-t-butylphenol) | (part) | 1.5 | 0.5 | 0.5 | — | — |
| (e) | Sulfur | (part) | 0.1 | 0.075 | 0.15 | — | 0.1 |
| (e) | p-Quinonedioxime | (part) | — | — | — | 0.06 | — |
| | Diphenylguanidine (vulcanization accelerator) | (part) | — | 0.038 | 0.075 | — | 0.05 |

Physical properties of the above obtained cured rubbers are shown in the following Table 7.

Table 7

| Physical property | | | Example 10 | Example 11 | Example 12 | Example 13 | Example 14 |
|---|---|---|---|---|---|---|---|
| Tensile strength | (at 20°C) | (Kg/cm$^2$) | 186 | 203 | 193 | 196 | 195 |
| Elongation | (at 20°C) | (%) | 113 | 170 | 170 | 170 | 155 |
| $E_{10}$ | (at 20°C) | (Kg/cm$^2$) | 294 | 300 | 291 | 243 | 231 |
| $\Gamma$ | (at 20°C) | (Kg/cm) | 40 | 25 | 30 | 36 | 42 |
| Tensile strength retention | | (%) | 68 | 62 | 65 | 67 | 61 |

Compounding Recipe 6

| Ingredient | | | Example 8 | Example 9 |
|---|---|---|---|---|
| (a) | Isoprene rubber (Natsyn 2200) | (part) | 57 | 57 |
| (b) | Divinylbenzene (DVB) | (part) | 31 | 30 |
| (b) | α-Methylstyrene (αMS) | (part) | 12 | 13 |
| | Weight ratio of DVB/αMS | (part) | 72/28 | 70/30 |
| (c) | Dicumyl peroxide | (part) | 1.5 | 1.5 |
| (d) | N-phenyl-N'-isopropyl-p-phenylenediamine | (part) | 0.5 | 0.5 |
| (e) | Sulfur | (part) | 0.1 | 0.1 |
| | Diphenylguanidine (vulcanization accelerator) | (part) | 0.05 | 0.05 |

Physical properties of the above mentioned cured rubbers are shown in the following Table 6.

It can be seen from Table 7 that the cure rubbers have excellent Young's modulus, tear energy and tensile strength retention.

What we claim is:
1. A one shot mouldable and curable homogeneous rubber composition having a high Young's modulus, consisting essentially of
   100 parts by weight of a mixture of the following ingredients (a) and (b),
   said ingredient (a) being polyisoprene rubber having at least 90% of cis-1,4bonds, and
   said ingredient (b) being a monomer mixture composed of divinylbenzene and α-methylstyrene,
   c. 0.5–2.5 parts by weight of a dialkyl peroxide to initiate polymerization of monomers of monomer mixture (b) and to cause cross-linking between the polymer formed from monomer mixture (b) and ingredient (a), and d. 0.1–2.5 parts by weight of at least one compound selected from group consisting of aromatic secondary amines and alkyl substituted phenols to secure the heat resistance and stability of the cured rubber, the weight ratio of divinylbenzene/α-methylstyrene in said ingredient (b) being 80/20–65/35 and the weight ratio of said ingredient (a)/said ingredient (b) being 65/35–50/50, and the rubber composition cured at 120°–180°C having a Young's modulus of 100–500 Kg/cm$^2$, a tear energy Γ of at least 20 Kg/cm and a tensile strength retention at 100°C of at least 60%.

2. The rubber composition as claimed in claim 1, wherein said dialkyl peroxide is at least one compound selected from the group consisting of dicumyl peroxide, t-butyl cumyl peroxide and 1,1-bis-t-butyl-3,3,5-trimethylperoxycyclohexane.

3. The rubber composition as claimed in claim 1, wherein said ingredient (d) is at least one compound selected from the group consisting of N-phenyl-N'-isopropyl-p-phenylenediamine, phenyl-β-naphthylamine, diphenylamine, 2,6-di-t-butyl-4-methylphenol, 1,1'-bis(4-hydroxyphenyl) cyclohexane, 2,2'-methylene-bis(4-methyl-6-t-butylphenol), 4,4'-thio-bis(6-t-butyl-3-methylphenol) and styrenated phenol.

4. The rubber composition as claimed in claim 1, wherein the weight ratio of the ingredient (a)/the ingredient (b) is 60/40–55/45.

5. The rubber composition as claimed in claim 1, wherein the weight ratio of divinylbenzene/α-methylstyrene is 80/20–70/30.

6. The rubber composition as claimed in claim 1, wherein the amount of the ingredient (c) is 0.8–2.0 parts by weight based on 100 parts by weight of the total amount of the ingredients (a) and (b).

7. The rubber composition as claimed in claim 1, wherein the amount of the amine compound of the ingredient (d) is 0.3–0.7 part by weight based on 100 parts by weight of the total amount of the ingredients (a) and (b).

8. The rubber composition as claimed in claim 1, wherein the amount of the phenol compound of the ingredient (d) is 0.5–2.0 parts by weight based on 100 parts by weight of the total amount of the ingredients (a) and (b).

* * * * *